US012762364B2

(12) United States Patent
Scarselli

(10) Patent No.: US 12,762,364 B2
(45) Date of Patent: Oct. 13, 2026

(54) REGISTRATION AND TRACKING SYSTEM AND METHODS OF USE

(71) Applicant: Bruno Scarselli, New York, NY (US)

(72) Inventor: Bruno Scarselli, New York, NY (US)

(*) Notice: Subject to any disclaimer, the term of this patent is extended or adjusted under 35 U.S.C. 154(b) by 0 days.

(21) Appl. No.: 19/209,552

(22) Filed: May 15, 2025

(65) Prior Publication Data

US 2025/0342329 A1 Nov. 6, 2025

Related U.S. Application Data

(63) Continuation-in-part of application No. 18/496,530, filed on Oct. 27, 2023, which is a continuation of application No. 17/714,539, filed on Apr. 6, 2022, now Pat. No. 11,842,249, and a continuation-in-part of application No. 17/616,256, filed as application No. PCT/US2019/035237 on Jun. 3, 2019, and a continuation-in-part of application No. 16/429,784, filed on Jun. 3, 2019, now Pat. No. 12,370,622.

(60) Provisional application No. 63/647,853, filed on May 15, 2024, provisional application No. 63/171,212, filed on Apr. 6, 2021, provisional application No. 62/679,814, filed on Jun. 2, 2018.

(51) Int. Cl.
*G06K 7/10* (2006.01)
*G06K 7/14* (2006.01)

(52) U.S. Cl.
CPC ....... *G06K 7/10831* (2013.01); *G06K 7/1413* (2013.01); *G06K 7/1417* (2013.01)

(58) Field of Classification Search
CPC ............ G06Q 10/087; G06Q 30/0206; G06Q 10/0833; G06Q 10/0838; G06Q 20/401; G06K 7/10831; G06K 19/00; G06K 7/1439; G06K 7/1413; G06K 7/1417
USPC ...................................................... 235/462.1
See application file for complete search history.

(56) References Cited

U.S. PATENT DOCUMENTS

| | | | |
|---|---|---|---|
| 4,467,172 | A | 8/1984 | Ehrenwald et al. |
| 5,656,186 | A | 8/1997 | Mourou et al. |
| 6,616,051 | B1 | 9/2003 | Zidon |
| 6,977,137 | B2 | 12/2005 | Borrelli et al. |
| 7,302,703 | B2 | 11/2007 | Burns |
| 9,235,848 | B1 | 1/2016 | Gourley et al. |
| 9,373,011 | B2 | 6/2016 | Ahmadloo |
| 9,849,364 | B2 | 12/2017 | Tran et al. |

(Continued)

FOREIGN PATENT DOCUMENTS

| | | | |
|---|---|---|---|
| CA | 2942229 | A1 | 3/2018 |
| CN | 109829731 | A | 5/2019 |

(Continued)

OTHER PUBLICATIONS

International Search Report and Written Opinion for PCT/US2025/029620, dated Jul. 8, 2025.

(Continued)

*Primary Examiner* — Daniel St Cyr
(74) *Attorney, Agent, or Firm* — Todd A. Serbin; Maynard Nexsen PC

(57) ABSTRACT

A system for tracing a newly mined stone (rough) through a stream of commerce comprising: at least a nanotag; a nanotag reader; a processor; a database for storing information related to the stone and associated with the nanotag; and, at least one blockchain for storing at least one entry associated with the stone.

9 Claims, 10 Drawing Sheets

(56) References Cited

U.S. PATENT DOCUMENTS

| | | | |
|---|---|---|---|
| 9,915,619 | B2 | 3/2018 | Mugrabi et al. |
| 9,992,022 | B1 | 6/2018 | Chapman et al. |
| 10,201,939 | B1 | 2/2019 | Pare et al. |
| 10,269,009 | B1 | 4/2019 | Winklevoss et al. |
| 10,475,355 | B2 | 11/2019 | Hui et al. |
| 10,693,872 | B1 | 6/2020 | Larson et al. |
| 11,842,249 | B2 * | 12/2023 | Scarselli .......... G06K 19/06159 |
| 12,370,622 | B2 * | 7/2025 | Scarselli .............. B23K 26/009 |
| 2001/0028390 | A1 | 10/2001 | Hayashi |
| 2003/0055413 | A1 * | 3/2003 | Altshuler ............. A61B 18/203 606/9 |
| 2004/0196501 | A1 | 10/2004 | Silverbrook et al. |
| 2005/0017082 | A1 | 1/2005 | Moran et al. |
| 2006/0117011 | A1 | 6/2006 | Arbel |
| 2006/0196858 | A1 * | 9/2006 | Barron ...................... B44F 1/06 219/121.69 |
| 2006/0207976 | A1 * | 9/2006 | Bovatsek ........... B23K 26/0006 219/121.69 |
| 2007/0030795 | A1 * | 2/2007 | Kikuawa ............ G11B 7/24065 369/283 |
| 2007/0038530 | A1 | 2/2007 | Gemex |
| 2007/0199930 | A1 | 8/2007 | Mcelroy et al. |
| 2008/0000885 | A1 | 1/2008 | Kaplan et al. |
| 2008/0149710 | A1 | 6/2008 | Silverbrook et al. |
| 2008/0198001 | A1 | 8/2008 | Sarma et al. |
| 2009/0070238 | A1 | 3/2009 | Moryto |
| 2011/0095579 | A1 | 4/2011 | Hill |
| 2012/0101830 | A1 | 4/2012 | Dholakiya |
| 2013/0010280 | A1 | 1/2013 | Palmieri et al. |
| 2013/0126573 | A1 * | 5/2013 | Hosseini ................ B23K 26/53 225/2 |
| 2013/0129986 | A1 | 5/2013 | Heley et al. |
| 2013/0175339 | A1 | 7/2013 | Svetal |
| 2013/0183775 | A1 | 7/2013 | Bergmann et al. |
| 2014/0092718 | A1 * | 4/2014 | Kumar ................... B82Y 30/00 369/100 |
| 2014/0185065 | A1 * | 7/2014 | Shah .................. H04N 1/40037 358/1.7 |
| 2014/0263634 | A1 | 9/2014 | Iqbal et al. |
| 2014/0312017 | A1 | 10/2014 | Potemkin et al. |
| 2015/0081589 | A1 | 3/2015 | Auden |
| 2015/0101365 | A1 | 4/2015 | Hui et al. |
| 2015/0378143 | A1 | 12/2015 | Auguste |
| 2016/0085955 | A1 | 3/2016 | Lerner |
| 2016/0300234 | A1 | 10/2016 | Moss-Pultz |
| 2016/0335609 | A1 | 11/2016 | Jenkins |
| 2016/0342987 | A1 * | 11/2016 | Thomas ............... G06Q 20/381 |
| 2017/0098291 | A1 | 4/2017 | Code et al. |
| 2017/0236143 | A1 | 8/2017 | Code et al. |
| 2017/0307537 | A1 | 10/2017 | Yeung et al. |
| 2017/0330174 | A1 | 11/2017 | Demarinis et al. |
| 2017/0331896 | A1 | 11/2017 | Holloway et al. |
| 2018/0082043 | A1 | 3/2018 | Witchey et al. |
| 2018/0094953 | A1 | 4/2018 | Colson et al. |
| 2018/0131927 | A1 | 5/2018 | Vora |
| 2019/0073720 | A1 | 3/2019 | Tal |
| 2019/0076006 | A1 | 3/2019 | Takeda |
| 2019/0108482 | A1 | 4/2019 | Vikas et al. |
| 2019/0147397 | A1 * | 5/2019 | Hodges .................. G06Q 10/08 705/333 |
| 2019/0147709 | A1 | 5/2019 | Schoner |
| 2019/0253256 | A1 | 8/2019 | Saab et al. |
| 2019/0279204 | A1 | 9/2019 | Norton et al. |
| 2019/0366475 | A1 | 12/2019 | Scarselli |
| 2020/0014816 | A1 | 1/2020 | Speasl et al. |
| 2020/0050834 | A1 | 2/2020 | Niskanen |
| 2020/0184465 | A1 | 6/2020 | Kislev et al. |
| 2021/0073913 | A1 | 3/2021 | Ingargiola |
| 2021/0319722 | A1 | 10/2021 | Ionin et al. |
| 2024/0062025 | A1 | 2/2024 | Scarselli |
| 2024/0080964 | A1 | 3/2024 | Wang et al. |

FOREIGN PATENT DOCUMENTS

| | | | |
|---|---|---|---|
| IN | 201641015689 | A | 5/2016 |
| JP | H06324272 | A | 11/1994 |
| JP | H11138896 | A | 5/1999 |
| JP | 2000-118633 | A | 4/2000 |
| JP | 2002-086282 | A | 3/2002 |
| JP | 2002-092327 | A | 3/2002 |
| JP | 2002-109271 | A | 4/2002 |
| JP | 2004-086828 | A | 3/2004 |
| JP | 2006-068762 | A | 3/2006 |
| JP | 2007-030033 | A | 2/2007 |
| JP | 2008-090424 | A | 4/2008 |
| JP | 2008-531143 | A | 8/2008 |
| JP | 2009-285733 | A | 12/2009 |
| JP | 2014-085757 | A | 5/2014 |
| JP | 2016-179004 | A | 10/2016 |
| JP | 2018-526662 | A | 9/2018 |
| JP | 2019-042413 | A | 3/2019 |
| JP | 2020-520503 | A | 7/2020 |
| JP | 2020-521149 | A | 7/2020 |
| JP | 2020-524924 | A | 8/2020 |
| JP | 2020-528592 | A | 9/2020 |
| RU | 2357870 | C1 | 6/2009 |
| RU | 2382122 | C2 | 2/2010 |
| RU | 109877 | U1 | 10/2011 |
| WO | 97/25177 | A1 | 7/1997 |
| WO | 99/33671 | A1 | 7/1999 |
| WO | 00/66315 | A1 | 11/2000 |
| WO | 2016/191704 | A1 | 12/2016 |
| WO | 2016/205336 | A1 | 12/2016 |
| WO | 2017/006092 | A1 | 1/2017 |
| WO | 2017/046973 | A1 | 3/2017 |
| WO | 2018/154415 | A1 | 8/2018 |
| WO | 2018/217788 | A1 | 11/2018 |
| WO | 2018207180 | A1 | 11/2018 |
| WO | 2019/030520 | A1 | 2/2019 |

OTHER PUBLICATIONS

Office action received for Canadian Patent Application No. 3214580, mailed on Nov. 29, 2024, 04 pages.

Search Report received for Chinese Patent Application No. 201980098930.6, mailed on Mar. 20, 2025, 01 page.

Partial Supplementary European Search Report received for European Patent Application No. 19811983.6 , mailed on Feb. 2, 2022, 11 pages.

Extended European Search Report received for European Patent Application No. 19811983.6 , mailed on May 31, 2022, 13 pages.

Office action received for Israel Patent Application No. 288650, mailed on Jul. 24, 2024, 04 pages.

First Office action received for Israel Patent Application No. 288652, mailed on Nov. 7, 2024, 04 pages.

Second Office action received for Israel Patent Application No. 288652, mailed on Nov. 6, 2025, 04 pages.

First Office Action received for Japanese Patent Application No. 2021-572350, mailed on Sep. 12, 2023, 11 pages including English translation.

Second Office Action received for Japanese Patent Application No. 2021-572350, mailed on May 28, 2024, 13 pages including English translation.

Decision of Refusal received for Japanese Patent Application No. 2021-572350, mailed on Nov. 12, 2024, 09 pages including English translation.

Extended European Search Report received for European Patent Application No. 19931716.5 , mailed on May 16, 2023, 10 pages.

Office Action received for European Patent Application No. 19931716.5 , mailed on Feb. 11, 2025, 05 pages.

Extended European Search Report received for European Patent Application No. 22785360.3 , mailed on Jan. 17, 2025, 10 pages.

Office Action received for European Patent Application No. 22785360.3, mailed on Dec. 17, 2025, 05 pages.

International preliminary report on patentability Chapter I received for International Patent Application No. PCT/US2019/035237, mailed on Dec. 17, 2020, 08 pages.

(56) References Cited

OTHER PUBLICATIONS

Office Action received for Indian Patent Application No. 202217000087, mailed on Sep. 27, 2022, 06 pages.
International Search Report and Written Opinion received for International Patent Application No. PCT/US2019/064593, mailed on Feb. 3, 2020, 09 pages.
International preliminary report on patentability Chapter II received for International Patent Application No. PCT/US2019/064593, mailed on Jun. 21, 2021, 17 pages.
Office Action received for Indian Patent Application No. 202217000088, mailed on Sep. 12, 2022, 06 pages.
International Search Report and Written Opinion received for International Patent Application No. PCT/US2022/023641, mailed on Jun. 21, 2022, 11 pages.
International preliminary report on patentability Chapter I received for International Patent Application No. PCT/US2022/023641, mailed on Oct. 19, 2023, 10 pages.
International Search Report and Written Opinion received for International Patent Application No. PCT/US2019/035237, mailed on Sep. 23, 2019, 11 pages.
Yoshino et al., "Micromachining with a High Repetition Rate Femtosecond Fiber Laser", JLMN Journal of Laser Micro/ Nanoengineering, vol. 3, No. 3, Dec. 2008, pp. 157-162.
Smith et al., "Advances in Femtosecond micromachining and Inscription of Micro and Nano Photonic Devices", In book: Frontiers in Guided Wave Optics and Optoelectronics, Feb. 2010, pp. 295-320.
Cartier et al., "Blockchain, Chain of Custody and Trace Elements: An Overview of Tracking and Traceability Opportunities in the Gem Industry" The Journal of Gemmology, vol. 36, Issue 3, 2018, pp. 212-227.
Everledger, "EDGE 2016; The power of the individual", Retrieved from the internet: https://www.youtube.com/watch?v=GAdjL-nultl.
Batista et al., "QR code micro-certified gemstones: femtosecond writing and Raman characterization in Diamond, Ruby and Sapphire", Scientific Reports, vol. 9, Article No. 8927, Jun. 20, 2019, pp. 1-7.
"$5 Million of Coloured Diamonds Launched Under PinkCoin, World's First Diamond Backed Crypto Currency", Jan. 19, 2016, Webpage available at: https://www.globenewswire.com/news-release/2016/01/19/802921/0/en/5-Million-of-Coloured-Diamonds-Launched-Under-PinkCoin-World-s-First-Diamond-Backed-Crypto-Currency.html.
"Laser marking by Oxford University spinout transforms diamond security", May 29, 2018, Webpage available at: https://opsydia.com/2018/05/29/laser-marking-by-oxford-university-spinout-transforms-diamond-security/.
"Blockchain Fintech Cmpany Alphapoint Announces Regulated Asset Backed Token", May 14, 2018, Webpage available at: https://alphapoint.com/press/blockchain-fintech-company-alphapoint-announces-regulated-asset-backed-token/.
Sotillo et al., "Diamond photonics platform enabled by femtosecond laser writing", Scientific Reports, vol. 6, Article No. 35566, Oct. 17, 2016, pp. 1-9.
"About Cedex", Wayback Machine, May 12, 2018, Webpage available at: https://web.archive.org/web/20180512004336/https://cedex.com/.
Davis et al., "Writing waveguides in glass with a femtosecond laser", Optics Letters, vol. 21, Issue 21, Nov. 1996, pp. 1729-1731. (Only Abstract).
Barker et al., "Transitions: Recommendation for transitioning the use of cryptographic algorithms and key lengths", In: NIST Special Publication 800-131A, Jan. 2011, 27 pages. Retrieved from <http://www.gocs.eu/pages/fachberichte/archiv/075-sp800-131A.pdf>.
Skandarajah et al., "Quantitative Imaging with a Mobile Phone Microscope", PLoS One, vol. 9, Issue 5, e96906, May 2014, pp. 1-12.
Search Report received for Japanese Patent Application No. 2025-037237, mailed on Feb. 13, 2026, 41 pages including English translation.
Notice of Hearing received for Indian Patent Application No. 202217000087, mailed on Jan. 20, 2026, 03 pages.
Lucas Mearian, "De Beers and other jewelry industry giants create blockchains to verify gems", Computerworld, Publication data: May 10, 2018, Webpage available at: https://www.computerworld.com/article/1689183/de-beers-and-other-jewelry-industry-giants-create-blockchains-toverify-gems.html.
Gattass et al., "Femtosecond laser micromachining in transparent materials", Nature Photonics, vol. 2, 2008, pp. 219-225. (Only Abstract Submitted).
Search Report received for Chinese Patent Application No. 201980098930.6, mailed on Mar. 27, 2026, 02 pages.
Search Report received for Japanese Patent Application No. 2023-562249, mailed on Mar. 3, 2026, 32 pages including English translation.
Office Action received for Japanese Patent Application No. 2023-562249, mailed on Mar. 10, 2026, 14 pages including English translation.
Office Action received for Japanese Patent Application No. 2025-037237, mailed on Mar. 31, 2026, 10 pages including English translation.
MicrobeScope Instructions—Quick Start, 4D Optical LLC, Feb. 24, 2020, URL: https://web.archive.org/web/20200224171222/http://MicrobeScope.com/user-information.html.
Kirsten Dirksen, Scanning your gut bacteria with this smartphone health tool, YouTube, Jun. 13, 2016, URL: https://www.YouTube.com/watch?v=aO_Hfmpq5t4.
How Retailers Can Deliver Diamond Security & Build Consumer Confidence, Sarine The Diamond Blog (https://blog.sarine.com/), Jul. 16, 2019, URL: https://blog.sarine.com/how-retailers-can-deliver-diamondsecurity-build-consumer-confidence.
Search Report received for Russian Patent Application No. 2025-125771, mailed on Apr. 4, 2026, 2 pages including English translation.

* cited by examiner

State of the Industry

- Current blockchains do not give title of ownership
- Blockchains used for different diamond registrations are proprietary to certain companies and do not transverse or communicate with other blockchains
- No technology exists to adequately fingerprint an individual precious stone
- Current blockchains are private and do not share information of origin.

FIG. 1

Authentia: Title of Ownership with Origin for the Life of a Diamond

Public Blockchain and Web3 Platform for the world of precious gems .

Authentia leverages Title Ownership ideas by building registration terminals and uploading rough directly at the mine. This will limit aggregation and prevent introduction of conflict goods though the supply chain.

Authentia can integrate and strengthen existing technologies and platforms.

The Authentia title provides brand identity to diamonds from the mine to the consumer.

FIG. 2

Authentia Stages

Mine
Through our optical analysis and a proprietary certification process, we demonstrate ethical sourcing, fingerprint the provenance, and can guarantee the origin of every diamond.

Tender
Blockchain-based title token allows for the commercialization of rough stones at tender houses for escrow and consignment.

Manufacturer
Our technology and protocols follow the rough stones to cut and polished products. Value is added by registering manufacturing details on a distributed ledger and guaranteeing the provenance on the platform.

Gemological Lab
The labs can establish every diamond's journey from origin to end consumer, adding efficiency and credibility of their services by leveraging our proprietary technology and platform.

Retail Brand
Our multi-layer platform allow our brands to compose luxury items out of various gems, metal, and designers, and update the title with the final design. Every title creates its own asset.

Auction House
Authentia is the perfect environment for commerce and ownership. Whether for consignment or for diamond trading, blockchain secures our industry's future profitability.

Final Consumer
From automated collateralization, lending, and insurance all the way to fractional ownership of diamonds, the Authentia marketplace will deliver consumer ownership to the world and takes the marketability of luxury items to a whole other level.

Capital Markets
The Authentia title brings trust and transparency to the market, enabling seamless trading, reliable verification and provenance of assets. This allows for fractional ownerships, giving investors in capital markets accurate information in a more accessible market for diamonds and luxury items.

FIG. 3A

Authentia

- A Title is issued in a decentralized blockchain ledger recording the identity of the Buyer tying it to that Asset via a Payment Verification. Authentia uses dual private and public key codes ensuring complete transactional security on its chains.
- A Smartphone reading for sub-surface nano tags can be read by Authentia's DiamondEye reader. Authentia developed 83 billion IDs which are deployed to recognize a mine's product distinguish from another mine's product. The nano IDs are invisible to the naked eye and do not pose danger to clarity or color grading.

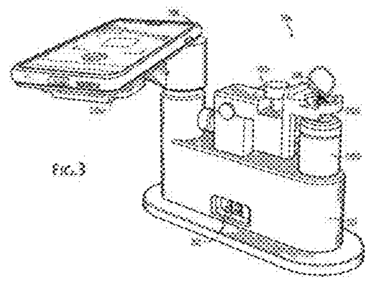

FIG. 4

- The Authentia title of ownership can provide brand identity to diamonds or precious gems from the mine to the consumer.
- Authentia's Title will restore confidence to the diamond's world markets as to where the product is mined, and it will insure ethical sourcing to the consumer.
- Authentia's platform can register several million units of rough and/or polished diamonds in an hour without slowing production times.
- Authentia's seamless integrations drastically improve vertical integration between miners, manufacturers, gemological labs, brands, merchants, and consumers.
- Authentia's platform operating on public blockchain allows for great flexibility and ease of integration with collaborators.

FIG. 7

Use Cases with the Authentia Platform

- Secure and transparent system for the sale of rough and polished diamond with Titles.
- Authentia membership is for Governments, Mines, Manufacturers, Gem Labs, Retail Stores.
- Authentia will license its Title of Ownership to the retail community.
- Authentia will license its Smartphone sub-surface nano reading technology.

FIG. 8

Authentia is A Unique Solution

Ability to integrate and enhance existing traceability systems:

| | tracr | iTraceiT | AURA BLOCKCHAIN CONSORTIUM | Authentia |
|---|---|---|---|---|
| **Traceability** | A permissioned approach to access their blockchain | Undisclosed | A private blockchain--a single consortium owning all the nodes | Operating on public, top-performing, and the most established blockchains |
| **Blockchain** | Access to network restricted | Self-owned blockchain networks exclusively | Built on Quorum, a hardly adopted protocol used mainly for self-owned and managed blockchains | Built on the most adopted and reputable blockchain protocol [EVM], easily integrating with most existing systems |
| **Scalability** | This platform restricts external integrations | Undisclosed | Any integrations or growth are subject to approval from and limited to node ownership | Seamless interoperability – a solution as an application layer on top of multiple blockchains |
| **Marketability** | No marketplace or financial instrumentation in sight | No marketplace or financial instrumentation in sight | No marketplace or financial instrumentation in sight | Market-ready, with our doors open to the whole world |
| **Financial Instrumentation** | No marketplace or financial instrumentation in sight | No marketplace or financial instrumentation in sight | No marketplace or financial instrumentation in sight | Unmatched programmability of worldwide accessible tokenized commodities via multi-blockchain technology |
| **Ownership** | Basic non-hierarchical and non-composable tokens | Undisclosed | It controls the blockchain that your assets are minted on, thus it controls your assets | A patented multi-layer ownership provenance process using hierarchical and composable tokens |
| **Title Implementation** | Secondary location | Secondary location | Secondary location | At true origin |

FIG. 9

REGISTRATION AND TRACKING SYSTEM AND METHODS OF USE

RELATED APPLICATIONS

This application claims the benefit of priority under 35 USC § 120 of U.S. patent application Ser. No. 16/429,784 filed Jun. 3, 2019, which claims priority to U.S. Provisional Patent Application No. 62/679,814 filed Jun. 2, 2018, and U.S. National Phase patent application Ser. No. 17/616,256 filed Dec. 3, 2021, which claims priority under PCT Article 8 to PCT/US2019/035237 filed on Jun. 3, 2019, and U.S. application Ser. No. 18/496,530 filed Oct. 27, 2023, which claims priority to U.S. Pat. No. 11,842,249 and U.S. Provisional Patent Application No. 63/171,212 filed on Apr. 6, 2021, and the benefit of priority under § 119(e) of U.S. Provisional Patent Application No. 63/647,853 filed May 15, 2024, the contents of which are incorporated herein by reference in their entireties.

FIELD OF THE INVENTION

The present invention, in some embodiments thereof, relates to the precious stone industry and, more particularly, but not exclusively, to a system and method for recording and/or tracking identity and ownership of precious stones.

BACKGROUND OF THE INVENTION

FIG. 1 lists some problems in the diamond industry, which currently is almost entirely a trust-based industry without sufficient protocols for diamond identification, tracking through the stream of commerce (including provenance), recordation of title of ownership and/or commercialization.

SUMMARY OF THE INVENTION

There is provided according to an aspect of the invention, a system for tracing a newly mined stone (rough) through a stream of commerce comprising at least a nanotag, a nanotag reader, a processor, a database for storing information related to the stone and associated with the nanotag, and at least one blockchain for storing at least one entry associated with the stone.

There is further provided according to an aspect of the invention, a system for building a precious stone marketplace, comprising at least a nanotag, a nanotag reader, a processor, a database for storing information related to the stone and associated with the nanotag, and at least one blockchain for storing at least one entry associated with the stone.

There is further provided according to an aspect of the invention, a system for utilizing commercial finance products comprising a system for tracing a newly mined stone (rough) through a stream of commerce using at least a nanotag, a nanotag reader, a processor, a database for storing information related to the stone and associated with the nanotag, and at least one blockchain for storing at least one entry associated with the stone.

There is further provided according to an aspect of the invention, a method for tracing a newly mined stone (rough) through a stream of commerce comprising using a system which includes at least a nanotag, a nanotag reader, a processor, a database for storing information related to the stone and associated with the nanotag, and at least one blockchain for storing at least one entry associated with the stone.

There is further provided according to an aspect of the invention, a method for building a precious stone marketplace, comprising using at least a nanotag, a nanotag reader, a processor, a database for storing information related to the stone and associated with the nanotag, and at least one blockchain for storing at least one entry associated with the stone.

There is further provided according to an aspect of the invention, a method for utilizing commercial finance products comprising using a system for tracing a newly mined stone (rough) through a stream of commerce using at least a nanotag, a nanotag reader, a processor, a database for storing information related to the stone and associated with the nanotag, and at least one blockchain for storing at least one entry associated with the stone.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example, are not necessarily to scale and are for purposes of illustrative discussion of embodiments of the invention. In this regard, the description taken with the drawings makes apparent to those skilled in the art how embodiments of the invention may be practiced.

In the drawings:

FIG. 1 is a list of prior art issues in the diamond industry;

FIG. 2 is a partial list of advantages of the current title of ownership system referred to as Authentia, in accordance with an exemplary embodiment of the invention;

FIG. 3A is a partial description of each step in the Authentia process, in accordance with an exemplary embodiment of the invention;

FIG. 4 is a partial description of at least two of the steps of the Authentia process partial description of each step in the Authentia process, in accordance with an exemplary embodiment of the invention;

FIG. 7 is a summary of some of the advantages of the Authentia process, in accordance with an exemplary embodiment of the invention;

FIG. 8 is a list of commercial applications of the Authentia process, in accordance with an exemplary embodiment of the invention; and FIG. 9 is a partial comparison between the Authentia process, in accordance with an exemplary embodiment of the invention, and other available industry solutions.

DESCRIPTION OF SPECIFIC EMBODIMENTS OF THE INVENTION

Figure 3B:
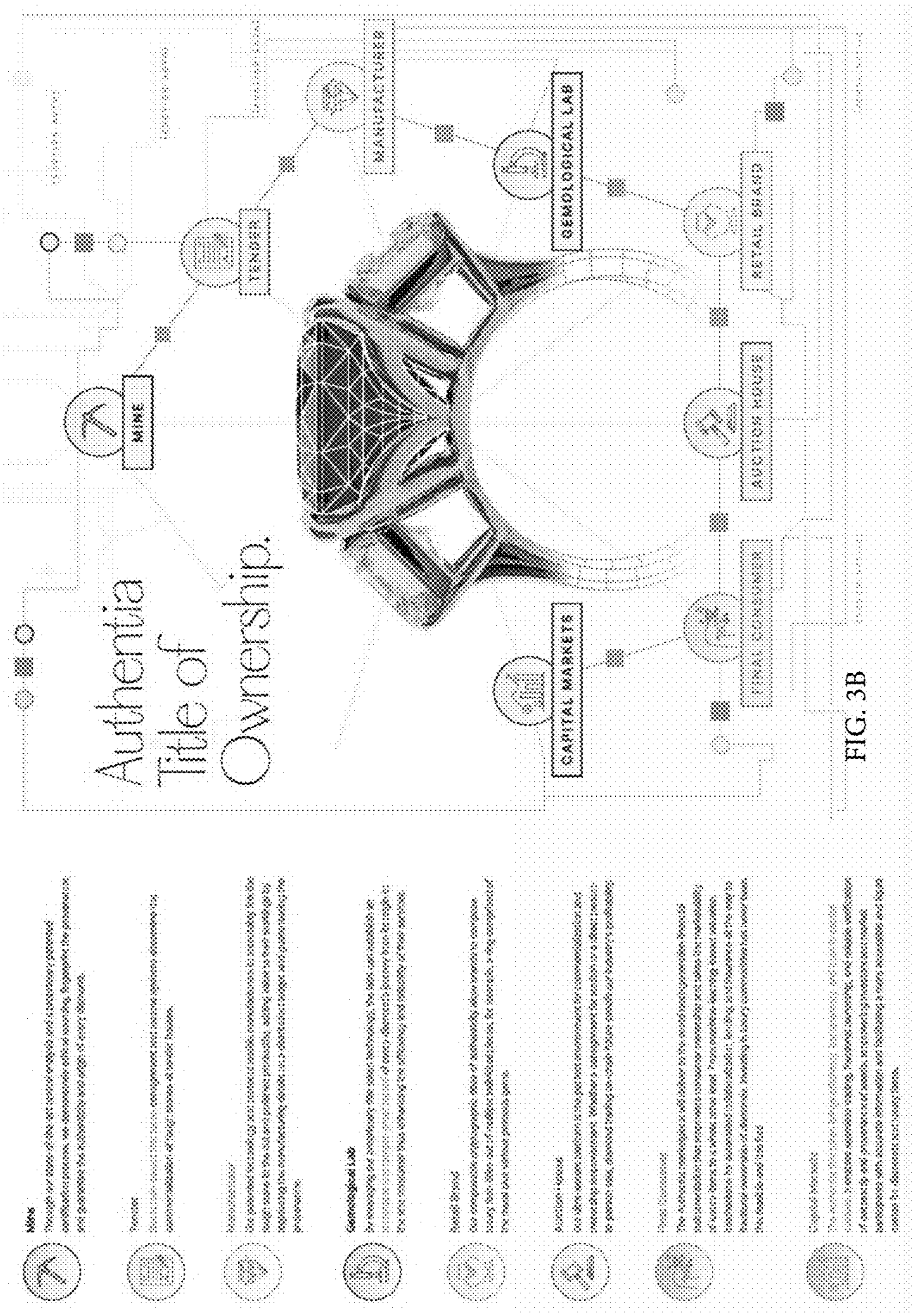
FIG. 3B is an additional partial description of each step in the Authentia process, in accordance with an exemplary embodiment of the invention.

The present invention, in some embodiments thereof, relates to the precious stone industry and, more particularly, but not exclusively, to a system and method for recording and/or tracking identity and ownership of precious stones.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

The registration and tracking system described herein will be referred to as the "Authentia" system/platform. The Authentia platform is a groundbreaking initiative that stands at the forefront of modernizing the mining industry through advanced blockchain technology and strategic legal achievements. The Authentia system/platform offers a unique amalgamation of technology and compliance, making it a perfect fit for addressing global challenges in diamond traceability and transparency.

In an embodiment of the invention, what is provided is a system for tracing a newly mined stone (rough) through a stream of commerce comprising: at least a nanotag; a nanotag reader; a processor; a database for storing information related to the stone and associated with the nanotag; and, at least one blockchain for storing at least one entry associated with the stone.

In an embodiment of the invention, the system further comprises a tagging unit coupled to a laser configured to create the nanotag using gentle modification without intentionally using an impurity within the stone, formed from voxels that are imperceptible when viewed at a magnification of 10× but visible to high magnification optical viewing methods; wherein the tagging unit is configured to uploaded information associated with the nanotag, through a communication connection, onto the blockchain; and wherein the information is encrypted upon uploading to the blockchain. Optionally, using a pulse energy between 10 nJ and 300 nJ.

In an embodiment of the invention, the nanotag reader comprises optics providing more than 10× magnification, a stone holder, a positioning system, an electronic imaging sensor and software interfaced to the at least one blockchain.

In an embodiment of the invention, the nanotag reader applies dream catcher mode to read the nanotag.

In an embodiment of the invention, what is provided is a method for tracing a newly mined stone (rough) through a stream of commerce comprising: using a system for tracing a newly mined stone (rough) through a stream of commerce for tagging the stone with at least one of a nanotag and information using the tagging unit; and, reading at least one of the nanotag and information using the nanotag reader, wherein at least one of the nanotag and information is registered on the at least one blockchain.

In an embodiment of the invention, the method further comprises encrypting at least one of the nanotag and the information upon uploading to the at least one blockchain and decrypting at least one of the nanotag and the information upon retrieval from the at least one blockchain.

In an embodiment of the invention, the reading is performed in the performance of a transaction including primary and secondary sales, use as collateral, monetization, investment, insurance, finance, logistics, chain of custody, verification, validation, certification, grading, law enforcement, brand enforcement, stone theft prevention, counterfeiting protection, stone recovery, commoditization, and trading.

In an embodiment of the invention, the information is related to at least one of the at least one stone's characteristics, ownership, provenance, location and past transactions.

In an embodiment of the invention, ownership information includes fractional ownership of the at least one stone.

In an embodiment of the invention, a transaction includes primary purchases of the at least one stone, secondary market trading of the at least one stone, collateralized lending, insurance, law enforcement, verification of the at least one stone and certification of the at least one stone.

Key features of the Authentia system include:

1. Public Blockchain Layer (FIG. 2): Authentia's pioneering approach incorporates a legally recognized title of ownership for mining operations, seamlessly integrated into the blockchain. This not only marks a significant advancement in legal and industrial blockchain integration but also enhances the credibility and security of our system.
2. Direct Upload from Mines (FIGS. 2, 3A, 3B, 4, 7, 8): The Authentia protocol allows for the direct uploading of material from mine, streamlining the supply chain, and enhancing traceability from the source.
3. Nanomarking of Diamonds (FIG. 4): The Authentia system utilizes a cutting-edge method to mark diamonds on a nanoscale. This innovation is useful in verifying the authenticity and traceability of each diamond. Authentia has considered a design that translates hexadecimal codes into a nano dotted grid pattern, in some embodiments of the invention.
4. Smartphone Compatibility (FIG. 4): The technology includes a feature enabling smartphones and other handheld devices to read these nanomarkings, making the verification process more accessible and user-friendly.

Authentia is not just a traceability platform; it is a comprehensive solution to the challenges facing the diamond (and other precious stones) industry, see FIGS. 3A, 3B. The disclosures of related disclosures by the same inventor, U.S. Pat. No. 11,842,249, U.S. application Ser. No. 16/429,784, U.S. application Ser. No. 17/616,256, and U.S. application Ser. No. 18/496,530 are incorporated herein in their entireties.

In some embodiments of the invention, the Authentia platform has at least three basic use cases, see for example FIGS. 3A, 3B, 6, 7, 8:

1. Tracing the rough stone at the Mine to Consumer. (Using the Authentia Asset Verification Protocol with blockchain);
2. Building a Marketplace, where in some scenarios, the market will be open only to natural diamonds and only to diamonds with authenticated title (i.e. authenticated via Authentia); and,
3. Building financial concepts/products to open diamond products via tokenization of RWA, securitization of diamond vehicles with application to the industry (e.g. insurance, lending/borrowing, fractional ownership, financing).

In some embodiments, data is gathered from users of the Authentia system to support the use of tools, possibly AI tools, where the aggregated data and/or the tools can be sold/licensed to system users for their use.

In an embodiment of the invention, at least a portion of the Authentia system sits on a 2nd layer (referenced as an elastic platform model laying over blockchain(s) with ability of interpolation "Ecosystem cross overs") where the layer is governed by validating nodes "stations" allowing to read completion of data components.

In some embodiments of the invention, cloud services are used in which the Authentia system opens entries to reflect the cutting scheme chosen by manufacturers, digital files then go to Gemological Laboratories, and thereafter the complete details and digital certificates are/remain stored on the Authentia system; as well as on at least one blockchain.

In an embodiment of the invention, the public data of the files will be uploaded on a Public chain while the Private data will be hidden.

In an embodiment of the invention, the Authentia system utilizes a plurality of blockchains (e.g., 3 blockchains, such as Polygon-Etherium-Binance) to allow the platform to have cheap costs for their services, large data recording, tradable data via securities.

In some embodiments of the invention, the Authentia system follows a protocol which includes at least some of the following information:

a) Contract # to registration
b) Continent
c) Country
d) Region
e) Mine name
f) Carat weight and # of stone(s)
g) Rough video or picture
h) Type rough
i) Color
j) Buyer's name (could be considered "Private info" in some embodiments of the invention)
k) Price Paid (could be considered "Private info" in some embodiments of the invention)
l) current physical location As described above, At least a portion of the Authentia system resides on a Layer (2nd) rather than a blockchain (imagine looking at a bridge atop a blockchain with a cloud component on its side). The layer will have validating nodes guided by an AI tool which scans the digital file and allows the file to move over the layer, in some embodiments of the invention.

In an embodiment of the invention, if the manufacturer elects not to manufacture the rough stone in to a polished diamond then the Protocol body is recorded on the ledger till such time it is transferred. For those willing to manufacture the rough stone, the Authentia system will spell out the details of manufacturing such as the CORP. The file also includes some or all, in some embodiments of the invention, a KP (Kimberly Certificate) to reflect the CORP details, a manufacturing scheme (file and scans with a final version to be cut in to it), a +/−12% variant from original plan (manufacturing scheme); and/or a seller Invoice of purchase. In some embodiments of the invention, at the time of purchase a serial # is given to the CORP which will be assigned to (i.e. will follow) the rough stone through its journey through the stream of commerce.

In an embodiment of the invention, the gemological labs will receive the entire folder to know where the diamond originated and will be able to record the "Origin" voice to the diamond certification. To date this is granted to Siteholders and a few other entities but not 48% of the market.

In an embodiment of the invention, upon conclusion of services, the digital representation of the CORP turns in to a Title of Ownership and lives in a permanent ledger (blockchain registration).

In some embodiments of the invention, the Authentia platform includes a cryptographic vault for asset management. The Authentia Asset Management Cryptographic Vault is a secure, blockchain-integrated system for managing high-value physical assets through verifiable digital ownership. It enables seamless delegation and reclamation of asset control between an owner and a digital asset manager.

Figure 5:
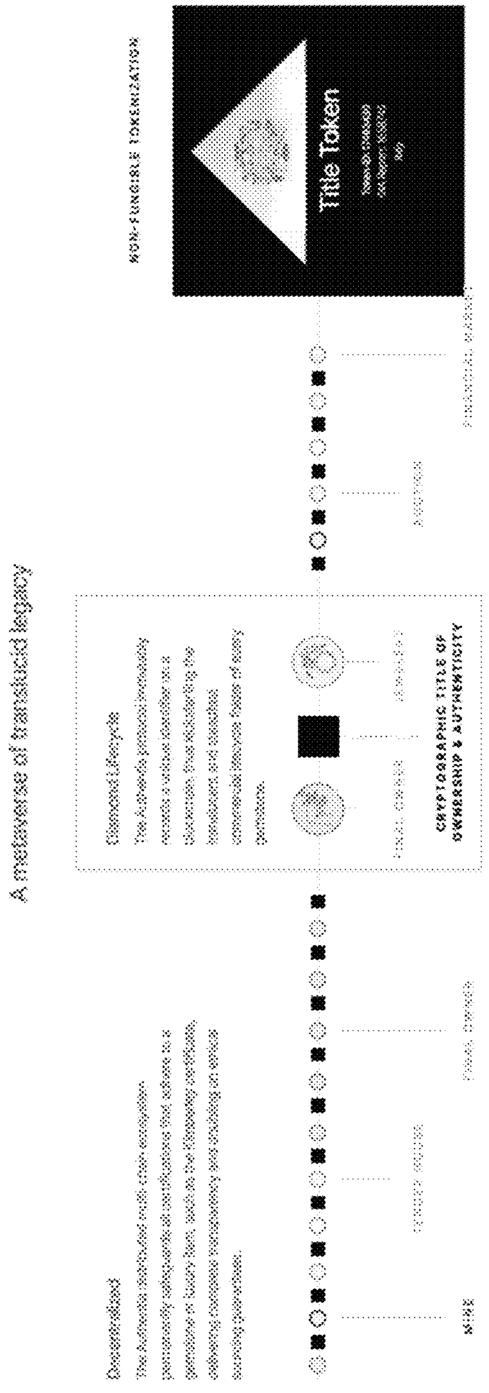
FIG. 5 is a block diagram of a part of the Authentia process, in accordance with an exemplary embodiment of the invention.
Figure 6:
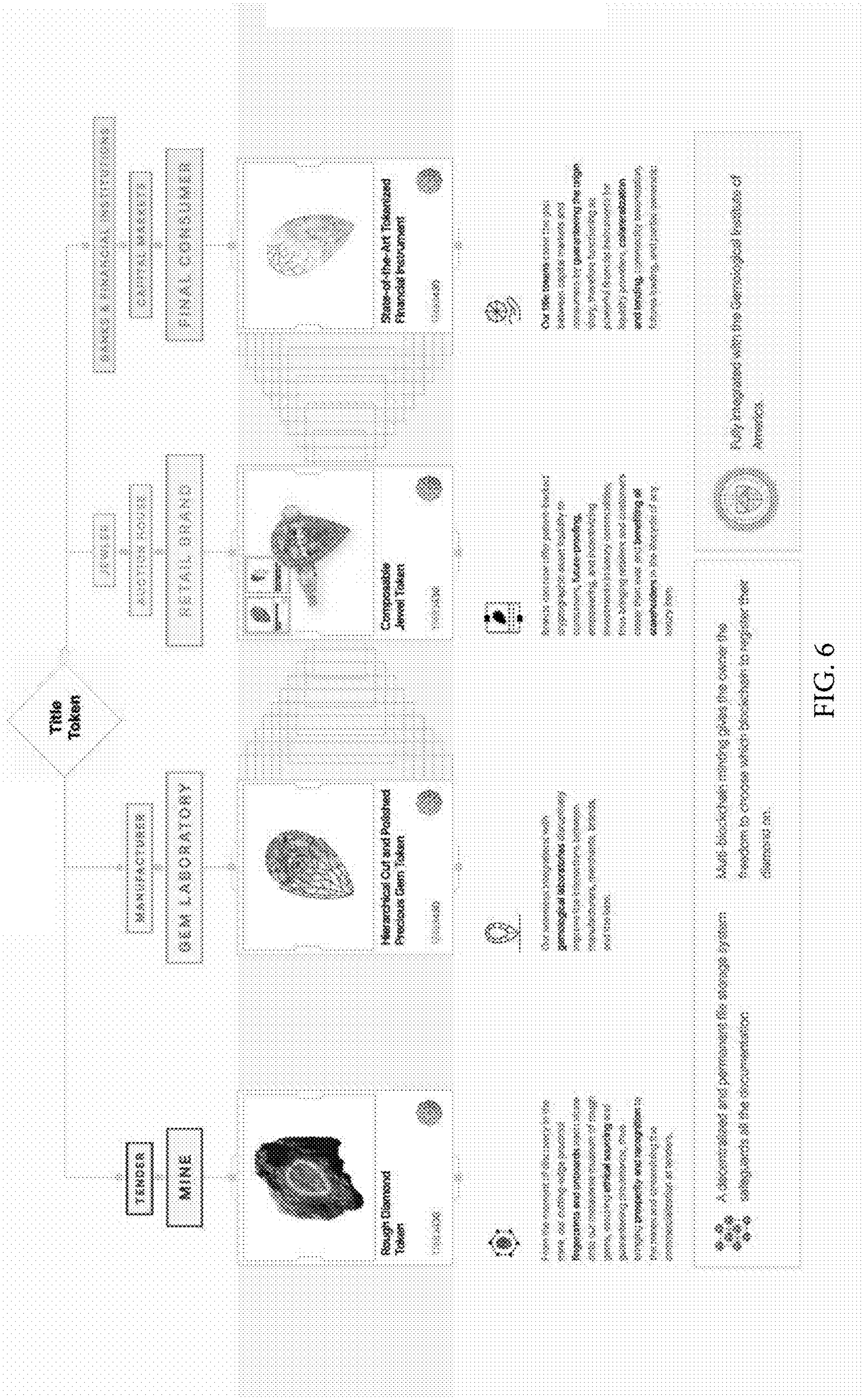
FIG. 6 is a partial flow chart and block diagram of a part of the Authentia process, in accordance with an exemplary embodiment of the invention.

Core Functionality:

- Assets are cryptographically registered and tokenized, FIG. 5, within the Authentia Vault.
- Asset managers can claim, release, and transfer assets on behalf of the original owner, maintaining full traceability.
- Owners can deposit or auto-reclaim assets from the vault via their own secured wallet interface.
- Every transaction is recorded immutably, enabling secure delegation, compliance, and liquidity unlocking.

Notable Components:

- Owner Wallet: Where asset ownership resides before and after delegation.
- Manager Vault: A secure holding state used by digital asset managers to control assets during management or liquidation.
- Authentia Panel (GUI): A dashboard interface allowing real-time actions like claim, release, deposit, and transfer, backed by cryptographic integrity.

Enhancements in Scope:

- Integration with digital contracts and inventory management systems.
- Advanced UX for transparency on contractual terms, due amounts, and release dates.

In some embodiments of the invention, the Authentia platform combines digital asset management, cryptographic ownership verification, and secure workflows in a single platform to facilitate asset liquidity, lending, and custody for high-value physical goods.

In some embodiments of the invention, the Authentia platform includes a computer vision solution, optionally enhanced by automation and artificial intelligence. The Authentia Computer Vision (CV) Solution is a proprietary image recognition system built to detect and decode microscopic or non-visible codes etched on high-value physical assets—such as diamonds. Designed for forensic-level precision and broad compatibility, it bridges physical objects with their digital twins using state-of-the-art computer vision and cryptographic linkage. It enables ultra-precise traceability and authentication using advanced imaging and AI-enhanced code recognition.

Technical Foundation:

- Built using Xcode, Python, OpenCV, and advanced image processing correction algorithms.
- Integrates the Dynamsoft Barcode Reader SDK—the same industrial-grade technology used in aerospace manufacturing (e.g., Lockheed Martin)—for decoding diverse symbologies.
- Supports decoding of complex symbologies including QR, Data Matrix, dot-peen, and other irregular markings.
- Compatible with a wide range of optical input devices and/or imaging hardware, including handheld/mobile devices, USB microscopes, mobile cameras and industrial optical systems.

Notable Features:

- Nano-scale decoding: Given the right optics, the system can resolve codes as small as nanometric.
- Dream-Catcher Mode: An internally developed picture-in-picture (PIP) visual aid that guides users to locate small or faint codes during scanning. In some embodiments of the invention, the visual aid is an overlay that magnifies and guides focus on hard-to-detect codes. It applies none, one, some or all of:
  - Gaussian blur to smooth noise and isolate underlying contours,
  - Adaptive thresholding to convert faint contrasts into binary maps,
  - Contrast enhancement and histogram equalization to make subtle etchings stand out,
  - Edge-preserving filters to avoid losing definition in microscopic patterns,
  - False-color tinting to highlight potential code zones based on pixel activity and variance.

Together, these transformations allow users to visually "catch" even near-invisible codes during active scanning.

- Future-ready architecture: Authentia serves as the foundation for smartphone- or mobile-device based microscopic code recognition, enabling real-world authentication of invisible (laser or molecular) markings on physical items using commodity devices in a trustless, cryptographically secured ecosystem.

The solution forms a notable piece of Authentia's physical-to-digital bridge, in some embodiments of the invention, verifying asset identity in the physical world through computer vision, cryptographic linkage, and/or invisible markings.

The system is fundamentally size-agnostic. Built to decode codes of any dimension, including nano-markings, its performance is designed to not be reliant (or solely reliant) on the CV software, for example, using the resolving power of the optical hardware to perform desired tasks, in some embodiments of the invention. Given proper imaging input, the Authentia platform can accurately read and/or resolve markings at any scale.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The term "plurality" means "two or more".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for tracing a newly mined stone (rough) through a stream of commerce comprising:

at least a nanotag;

a nanotag reader;

a processor;

a database for storing information related to the stone and associated with the nanotag;

at least one blockchain for storing at least one entry associated with the stone; and, a tagging unit coupled to a laser configured to create the nanotag using gentle modification without intentionally using an impurity within the stone, formed from voxels that are imperceptible when viewed at a magnification of 10× but visible to high magnification optical viewing methods; wherein the tagging unit is configured to uploaded information associated with the nanotag, through a communication connection, onto the blockchain, and wherein the information is encrypted upon uploading to the blockchain.

2. The system according to claim 1, wherein the nanotag reader comprises optics providing more than 10× magnification, a stone holder, a positioning system, an electronic imaging sensor and software interfaced to the at least one blockchain.

3. The system according to claim 1, wherein the nanotag reader applies dream catcher mode to read the nanotag.

4. A method for tracing a newly mined stone (rough) through a stream of commerce comprising:

using a system for tracing a newly mined stone (rough) through a stream of commerce comprising at least a nanotag;

a nanotag reader;

a processor;

a database for storing information related to the stone and associated with the nanotag, at least one blockchain for storing at least one entry associated with the stone; and, a tagging unit coupled to a laser configured to create the nanotag using gentle modification without intentionally using an impurity within the stone, formed from voxels that are imperceptible when viewed at a magnification of 10× but visible to high magnification optical viewing methods; wherein the tagging unit is configured to uploaded information associated with the nanotag, through a communication connection, onto the blockchain; and wherein the information is encrypted upon uploading to the blockchain, for tagging the stone with at least one of a nanotag and information using the tagging unit; and, reading at least one of the nanotag and information using the nanotag reader, wherein at least one of the nanotag and information is registered on the at least one blockchain.

5. The method according to claim 4, further comprising encrypting at least one of the nanotag and the information upon uploading to the at least one blockchain and decrypting at least one of the nanotag and the information upon retrieval from the at least one blockchain.

6. The method according to claim 4, wherein the reading is performed in the performance of a transaction including primary and secondary sales, use as collateral, monetization, investment, insurance, finance, logistics, chain of custody, verification, validation, certification, grading, law enforcement, brand enforcement, stone theft prevention, counterfeiting protection, stone recovery, commoditization, and trading.

7. The method according to claim 4, wherein the information is related to at least one of the at least one stone's characteristics, ownership, provenance, location and past transactions.

8. The method according to claim 7, wherein ownership information includes fractional ownership of the at least one stone.

9. The method according to claim 7, wherein a transaction includes primary purchases of the at least one stone, secondary market trading of the at least one stone, collateralized lending, insurance, law enforcement, verification of the at least one stone and certification of the at least one stone.

* * * * *